(12) United States Patent
Smith et al.

(10) Patent No.: US 11,634,621 B2
(45) Date of Patent: Apr. 25, 2023

(54) ORGANOPHILIC CLAYS AND DRILLING FLUIDS CONTAINING THEM

(71) Applicant: Evonik Corporation, Parsippany, NJ (US)

(72) Inventors: Sarah Smith, Prince George, VA (US); Gary Davis, Westhampton, NJ (US); Dennis Parrish, Sandston, VA (US); Miyako Hisamoto, Glen Allen, VA (US)

(73) Assignee: Evonik Corporation, Piscataway, NJ (US)

( * ) Notice: Subject to any disclaimer, the term of this patent is extended or adjusted under 35 U.S.C. 154(b) by 86 days.

(21) Appl. No.: 17/087,621

(22) Filed: Nov. 3, 2020

(65) Prior Publication Data

US 2021/0047554 A1  Feb. 18, 2021

Related U.S. Application Data

(62) Division of application No. 15/831,152, filed on Dec. 4, 2017, now Pat. No. 10,865,338.

(60) Provisional application No. 62/430,486, filed on Dec. 6, 2016.

(51) Int. Cl.
| | | |
|---|---|---|
| C09K 8/03 | (2006.01) | |
| C09K 8/36 | (2006.01) | |
| C09K 8/32 | (2006.01) | |

(52) U.S. Cl.
CPC ............... C09K 8/36 (2013.01); C09K 8/03 (2013.01); C09K 8/32 (2013.01)

(58) Field of Classification Search
CPC ... C09K 8/36; C09K 8/03; C09K 8/32; C09K 8/145; C01B 33/44
See application file for complete search history.

(56) References Cited

U.S. PATENT DOCUMENTS

| | | | |
|---|---|---|---|
| 3,499,853 A | | 3/1970 | Drawert et al. |
| 4,081,496 A | * | 3/1978 | Finlayson ............. C08K 5/19 523/310 |
| 5,718,841 A | * | 2/1998 | Mardis ............... C09J 11/04 516/34 |
| 6,483,821 B1 | | 11/2002 | Dabak et al. |
| 6,484,821 B1 | | 11/2002 | Patel et al. |
| 6,609,578 B2 | | 8/2003 | Patel et al. |
| 7,012,043 B2 | | 3/2006 | Klein et al. |
| 7,125,825 B2 | | 10/2006 | Moss |
| 7,229,958 B2 | | 6/2007 | Kohle et al. |
| 8,361,953 B2 | | 1/2013 | Nagy et al. |
| 8,563,499 B2 | | 10/2013 | Kohle et al. |
| 8,569,224 B2 | | 10/2013 | Kohle et al. |
| 8,883,712 B2 | | 11/2014 | Kohle et al. |
| 8,883,713 B2 | | 11/2014 | Parrish et al. |
| 9,279,032 B2 | | 3/2016 | Abdourazak et al. |
| 9,441,187 B2 | | 9/2016 | Kohle et al. |
| 9,617,502 B2 | | 4/2017 | Loughnane et al. |
| 10,011,806 B2 | | 7/2018 | Kohle et al. |
| 10,113,137 B2 | | 10/2018 | Kohle et al. |
| 10,214,471 B2 | | 2/2019 | Wiederhold et al. |
| 10,865,338 B2 | | 12/2020 | Smith et al. |
| 2003/0148892 A1 | | 8/2003 | Klein et al. |
| 2007/0197403 A1 | | 8/2007 | Dino |
| 2007/0197711 A1 | * | 8/2007 | Ijdo ................... C01B 33/44 524/445 |
| 2009/0203571 A1 | | 8/2009 | Nagy et al. |
| 2009/0294179 A1 | | 12/2009 | Ballard |
| 2012/0077943 A1 | | 3/2012 | Abdourazak et al. |
| 2012/0172539 A1 | | 7/2012 | Young et al. |
| 2012/0328790 A1 | | 12/2012 | Nagy et al. |
| 2013/0310282 A1 | | 11/2013 | Kulkarni et al. |
| 2015/0126431 A1 | | 5/2015 | Kohle et al. |
| 2016/0075975 A1 | | 3/2016 | Loughnane et al. |
| 2016/0102273 A1 | | 4/2016 | Declerco et al. |
| 2018/0155604 A1 | | 6/2018 | Smith et al. |
| 2019/0322919 A1 | | 10/2019 | Smith et al. |
| 2020/0199492 A1 | | 6/2020 | Xue et al. |

FOREIGN PATENT DOCUMENTS

| | | |
|---|---|---|
| CN | 105778076 | 7/2016 |
| EP | 2 402 424 | 1/2012 |
| GB | 1 226 122 | 3/1971 |
| WO | WO 01/28924 | 4/2001 |

(Continued)

OTHER PUBLICATIONS

European Search Report and Opinion for EP 17 20 4269 completed Mar. 15, 2018; (European counterpart of U.S. Appl. No. 15/831,152).
Meier, et al., "Determination of the Cation Exchange Capacity (CEC) of Clay Minerals Using the Complexes of Copper(II) Ion With Triethylenetetramine and Tetraethylenepentamine," *Clays and Clay Minerals* 47(3):386-388 (1999).
Rollins, et al., "Measurement of Exchangeable Cations in Bentonites," *Clays and Clay Minerals* 16:165-172 (1968).
https://www.glossary.oilfield.slb.com/Terms/b/base_oil.aspx downloaded on Mar. 22, 2019.
https://thesoapdish.com/oil-properties-chart.htm downloaded on Mar. 22, 2019.
U.S. Appl. No. 16/467,631, filed Jun. 7, 2019, US-2019/0322919 A1, Oct. 24, 2019, Smith.

(Continued)

*Primary Examiner* — Kumar R Bhushan
(74) *Attorney, Agent, or Firm* — Law Office of: Michael A. Sanzo, LLC

(57) ABSTRACT

The organophilic clay comprises a smectite-type clay ion exchanged with quaternary ammonium ions, where at least 75 mol-% of said quaternary ammonium ions are bis-(2-hydroxypropyl)-dimethylammonium fatty acid esters and at least 90% of the fatty acid moieties of the bis-(2-hydroxypropyl)-dimethylammonium fatty acid esters have a structure RC(O) with group R being a linear alkyl or alkenyl group containing from 9 to 21 carbon atoms. The organophilic clay is useful for thickening oil based compositions, in particular drilling fluids for drilling oil or gas wells, comprising an oil phase.

20 Claims, No Drawings

(56) References Cited

FOREIGN PATENT DOCUMENTS

| WO | WO 2006/079775 | 8/2006 |
| WO | WO 2006/096731 | 9/2006 |
| WO | WO 2014/004193 | 1/2014 |

OTHER PUBLICATIONS

U.S. Appl. No. 16/608,791, filed Oct. 25, 2019, US-2020/0199492 A1, Jun. 25, 2020, Xue.

Guo, et al., "Structure and properties of oligoamine shale inhibitors for drilling fluids," *Drilling Fluid Completion fluid* 32(1):26-29 (Jan. 2015), with English language machine translation attached.

\* cited by examiner

ORGANOPHILIC CLAYS AND DRILLING FLUIDS CONTAINING THEM

CROSS REFERENCE TO RELATED APPLICATIONS

The present application is a division of U.S. Ser. No. 15/831,152, filed on Dec. 4, 2017, which claims the benefit of U.S. provisional application 62/430,486, filed on Dec. 6, 2016. The contents of these previous applications is hereby incorporated by reference herein in its entirety.

FIELD OF THE INVENTION

The present invention relates to organophilic clays that can be used for thickening oil based compositions at high temperatures and for drilling fluids containing the organophilic clays.

BACKGROUND OF THE INVENTION

Organophilic clays, where a smectite-type clay has been ion exchanged with a quaternary tetraalkylammonium salt, such as dimethyl-di(C14-C18 alkyl)ammonium chloride, are known and have found use as thickeners for oil based compositions. They are particularly useful as additives for oil based drilling fluids to prevent the settling of particles, such as drill cuttings or barite weighting agents. However, tetraalkylammonium salts are poorly biodegradable and often bactericidal. Therefore, the use of organophilic clays containing tetraalkylammonium ions may cause environmental problems and is banned in some regions by environmental regulations. Therefore, there is a need for organophilic clays which do not contain poorly biodegradable organic components.

U.S. Pat. No. 5,718,841 discloses organophilic clays, where a smectite-type clay has been ion exchanged with a quaternary ammonium salt containing alkyl or aralkyl ester groups. Specifically disclosed are organophilic clays containing bis-(2-hydroxyethyl)-dimethylammonium dicoco fatty acid esters, bis-(2-hydroxyethyl)-dimethylammonium dihydrogenated tallow fatty acid esters and the corresponding fatty acid esters of the tris-(2-hydroxyethyl)-methylammonium ion. The document also discloses the use of these organophilic clays in non-aqueous drilling fluids.

The organophilic clays prepared in U.S. Pat. No. 5,718,841 contain quaternary ammonium ions with ester linkages that are susceptible to hydrolysis with water. This limits their use in oil based compositions containing water at high temperatures, such as w/o emulsion drilling fluids used at high temperatures.

WO 2006/079775 discloses drilling fluids containing an organophilic clay comprising a quaternary ammonium salt carrying substituents with amide linkages. Specifically disclosed are organophilic clays containing benzyl-dimethyl-(3-octadecylamidopropyl)ammonium ions. These organophilic clays are shown to thicken a w/o emulsion drilling fluid for 16 h at about 65° C. However, these organophilic clays have to be used in larger amounts than organophilic clays containing dimethyl-di(C14-C18 alkyl)ammonium ions. The quaternary ammonium salt carrying substituents with amide linkages used in WO 2006/079775 are also less biodegradable than quaternary ammonium salts carrying substituents with ester linkages.

WO 01/28924 discloses organophilic clays, where a smectite-type clay has been ion exchanged with a quaternary ammonium salt which is a diester of a quaternized trialkanolamine. The organophilic clays are used for preparing nanocomposites with a polymer.

Therefore, there is still a need for organophilic clays containing biodegradable quaternary ammonium ions, which organophilic clays have a thickening efficiency comparable to conventional organophilic clays containing tetraalkylammonium ions and which are sufficiently stable in w/o emulsions at elevated temperatures to be used in w/o emulsion drilling fluids.

SUMMARY OF THE INVENTION

It has now been found that novel organophilic clays containing bis-(2-hydroxypropyl)-dimethylammonium fatty acid esters are surprisingly more efficient in thickening a w/o emulsion drilling fluid than the bis-(2-hydroxyethyl)-dimethylammonium tallow fatty acid esters known from the prior art and provide better emulsion stability for the drilling fluid.

Subject of the invention is therefore an organophilic clay comprising a smectite-type clay ion exchanged with quaternary ammonium ions, wherein at least 75 mol-% of said quaternary ammonium ions are bis-(2-hydroxypropyl)-dimethylammonium fatty acid esters and at least 90% of the fatty acid moieties of said bis-(2-hydroxypropyl)-dimethylammonium fatty acid esters have a structure RC(O) with group R being a linear alkyl or alkenyl group containing from 9 to 21 carbon atoms.

A further subject of the invention is a drilling fluid for drilling oil or gas wells, comprising an oil phase and an organophilic clay of the invention.

Subject of the invention is also a first method for preparing an organophilic clay of the invention, wherein a mixture comprising a smectite-type clay, from 0 to 15% by weight water and/or polar solvent, and a quaternary ammonium salt comprising at least 75 mol-% bis-(2-hydroxypropyl)-dimethylammonium methylsulfate fatty acid ester, is homogenized at a temperature above the melting point of the quaternary ammonium salt, and the resulting homogenized mixture is dried.

A further subject of the invention is a second method for preparing an organophilic clay of the invention, wherein an aqueous suspension of a smectite-type clay is mixed with a quaternary ammonium salt, comprising at least 75 mol-% bis-(2-hydroxypropyl)-dimethylammonium methylsulfate fatty acid ester, at a temperature above the melting point of the quaternary ammonium salt, solids are separated from the resulting suspension and the separated solids are dried.

DETAILED DESCRIPTION OF THE INVENTION

The organophilic clay of the invention comprises a smectite-type clay. The term smectite-type clay designates a phyllosilicate comprising exchangeable cations, i.e. cations that can be exchanged with cations of a salt that is put in contact with the smectite clay in the presence of a polar solvent, such as water or an alcohol. Smectite-type clays typically have a three layer structure, where each sheet of the phyllosilicate comprises two silicate tetraeder layers and a layer of octahedrally coordinated metal ions, typically aluminum or magnesium, between the two tetraeder layers.

The smectite-type clay may be a natural clay mineral or a synthetic clay. Suitable natural smectite-type clays are bentonite, montmorillonite, hectorite, beidellite, stevensite or saponite minerals which are known from the prior art. Preferred natural smectite-type clays are bentonite clays, preferably bentonite clays containing at least 60% by weight of montmorillonite, preferably montmorillonite of composition $(Na,Ca)_{0.33}(Al,Mg)_2(Si_4O_{10})(OH)_2$. Suitable smectite-type clays are commercially available, for example hectorite from Element is Specialties under the trade name BENTONE® DS and bentonite from Bentonite Performance Minerals under the trade names NATIONAL® STANDARD and NATIONAL® PREMIUM.

The smectite-type clay preferably has a cation-exchange capacity of at least 75 milliequivalents of exchangeable cations per 100 g of clay. The term cation-exchange capacity in this context refers to the amount of cations that can be ion exchanged with a 1 N solution of ammonium acetate at pH 7. A method suitable for determining the cation-exchange capacity of smectite-type clays is known from M. B. Rollins, D. L. Pool, Clays and Clay Minerals 16 (1968) 165-172. Cation-exchange capacity may also be determined with the photometric method of L. P. Meier, P. Kahr, Clays and Clay Minerals 47 (1999) 386-388.

In the organophilic clay of the invention, the smectite-type clay is ion exchanged with quaternary ammonium ions. The term quaternary ammonium ion here refers to a cation containing at least one nitrogen atom carrying a positive electric charge, which nitrogen atom is bonded only to carbon atoms. Preferably, at least 75 mol-% and up to 100 mol-% of the exchangeable cations of the smectite-type clay are ion exchanged with quaternary ammonium ions.

At least 75 mol-% and up to 100 mol-% of the quaternary ammonium ions are bis-(2-hydroxypropyl)-dimethylammonium fatty acid esters. The bis-(2-hydroxypropyl)-dimethylammonium fatty acid esters may be monoesters of structure $(CH_3)_2N^+(CH_2CH(CH_3)OH)(CH_2CH(CH_3)OC(=O)R)$, diesters of structure $(CH_3)_2N^+(CH_2CH(CH_3)OC(=O)R)_2$, or mixtures of monoesters and diesters, where R is the hydrocarbon group of a fatty acid moiety RCOO. Preferably, the bis-(2-hydroxypropyl)-dimethylammonium fatty acid esters on average have a molar ratio of fatty acid moieties to ammonium nitrogen of from 1.2 to 2.0. At least 90% of the fatty acid moieties of the bis-(2-hydroxypropyl)-dimethylammonium fatty acid esters have a structure RC(O) where group R is a linear alkyl or alkenyl group containing from 9 to 21 carbon atoms.

The fatty acid moieties of the bis-(2-hydroxypropyl)-dimethylammonium fatty acid esters may be derived from a single fatty acid species, such as palmitic acid (hexadecanoic acid), stearic acid (octadecanoic acid) or oleic acid, or from a fatty acid mixture. Preferably, the fatty acid moieties of the bis-(2-hydroxypropyl)-dimethylammonium fatty acid esters are derived from fatty acid mixtures of natural origin, more preferably fatty acids from natural oils and fats. Suitable fatty acid mixtures may be derived from canola oil, coconut oil, cotton seed oil, palm oil, soy bean oil, sunflower oil or tallow.

The hydrocarbon groups R of the fatty acid moiety preferably have an average chain length of from 16 to 18 carbon atoms and most preferably from 16.5 to 17.8 carbon atoms. The average chain length is calculated on the basis of the weight fraction of individual fatty acids in the mixture of fatty acids. The average chain length may be adjusted by choosing a fatty acid from a natural source having the desired fatty acid average chain length or by mixing fatty acids from different natural source having different average chain lengths. Organophilic clays of the invention comprising fatty acid moieties with such average chain length provide higher viscosity to a drilling fluid comprising the organophilic clay as well as less viscosity loss over time at high temperatures. They also provide better emulsion stability when used in w/o emulsion drilling fluids.

The hydrocarbon groups R of the fatty acid moiety may be saturated or unsaturated and may have an iodine value of from 0 to 120, calculated for the free fatty acid RCOOH. The iodine value is the amount of iodine in g consumed by the reaction of the double bonds of 100 g of fatty acid, determined by the method of ISO 3961. The iodine value may be adjusted by choosing a fatty acid from a natural source having the desired iodine value, by mixing fatty acids from different natural source having different iodine values or by partially hydrogenating a fatty acid or fatty acid mixture having a higher iodine value. The bis-(2-hydroxypropyl)-dimethylammonium fatty acid esters preferably comprise less than 6% by weight of multiply unsaturated fatty acid moieties. The fraction of multiply unsaturated fatty acid moieties may be reduced by selective touch hydrogenation, which is a hydrogenation that selectively hydrogenates one double bond in a CH=CH—CH₂—CH=CH— substructure but not double bonds of monounsaturated hydrocarbon groups.

In addition to bis-(2-hydroxypropyl)-dimethylammonium fatty acid esters, the organophilic clay of the invention may also comprise (2-hydroxypropyl)-(1-methyl-2-hydroxyethyl)-dimethylammonium fatty acid esters. The (2-hydroxypropyl)-(1-methyl-2-hydroxyethyl)-dimethylammonium fatty acid esters may be monoesters of structure $(CH_3)_2N^+(CH_2CH(CH_3)OH)(CH(CH_3)CH_2OC(=O)R)$ monoesters of structure $(CH_3)_2N^+(CH_2CH(CH_3)OC(=O)R)(CH(CH_3)CH_2OH)$, diesters of structure $(CH_3)_2N^+(CH_2CH(CH_3)OC(=O)R)(CH(CH_3)CH_2OC(=O)R)$, or mixtures of monoesters and diesters, where R is the hydrocarbon group of a fatty acid moiety RCOO. The (2-hydroxypropyl)-(1-methyl-2-hydroxyethyl)-dimethylammonium fatty acid esters preferably comprise the same fatty acid moieties as the bis-(2-hydroxypropyl)-dimethylammonium fatty acid esters. The organophilic clay of the invention preferably comprises bis-(2-hydroxypropyl)-dimethylammonium fatty acid esters and (2-hydroxypropyl)-(1-methyl-2-hydroxyethyl)-dimethylammonium fatty acid esters in a molar ratio of from 4:1 to 20:1.

The organophilic clay of the invention may also comprise minor amounts of quaternary ammonium ions that do not contain ester moieties, such as bis-(2-hydroxypropyl)-dimethylammonium ions, (2-hydroxypropyl)-(1-methyl-2-hydroxyethyl)-dimethylammonium ions, methyl-tris-(2-hydroxyethyl)-ammonium ions or tetraalkyl ammonium ions.

The organophilic clay of the invention can be prepared by ion exchange between a smectite-type clay containing exchangeable metal or ammonium cations and a quaternary ammonium salt comprising at least 75 mol-% of bis-(2-hydroxypropyl)-dimethylammonium salt fatty acid ester. The ion exchange is preferably carried out with a smectite-type clay containing exchangeable sodium ions. Preferably, a smectite-type clay is used that has been ion exchanged with sodium. Such sodium exchanged smectite-type clays can be made by processes known from the prior art, such as from B. Isaac, Soil Sci. 107 (1969) 337-342, and are commercially available, for example sodium exchanged bentonite from Bentonite Performance Minerals under the trade name NATIONAL® PREMIUM.

The quaternary ammonium salt is preferably a methylsulfate salt and the bis-(2-hydroxypropyl)-dimethylammonium salt fatty acid ester is preferably a bis-(2-hydroxypropyl)-dimethylammonium methylsulfate fatty acid ester. The ion exchange may be carried out in a so called wet process by mixing an aqueous suspension of a smectite-type clay with a melt or an aqueous dispersion of the quaternary ammonium salt. The ion exchange may alternatively be carried out in a so called dry process by mixing a smectite-type clay with a melt of the quaternary ammonium salt. Mixing the smectite-type clay with the melt of the quaternary ammonium salt is preferably carried out in the presence of a small amount of water, a polar solvent or a mixture of both. The amount of water and/or polar solvent may be small enough to maintain the smectite-type clay in powder form or may be chosen large enough to convert the smectite-type clay into a kneadable mass.

The quaternary ammonium salt preferably has a melting point of from −10 to 80° C. Since the quaternary ammonium salt is typically a mixture of different species that does not have a sharp melting point, the term melting point in this context refers to the maximum in the melting curve determined by differential scanning calorimetry.

Bis-(2-hydroxypropyl)-dimethylammonium methylsulfate fatty acid esters useful for ion exchange with a smectite-type clay can be prepared by reacting bis-(2-hydroxypropyl)-methylamine or an amine mixture, containing (2-hydroxypropyl)-(1-methyl-2-hydroxyethyl)-methylamine and bis-(2-hydroxypropyl)-methylamine, with a fatty acid and quaternizing the resulting product with dimethyl sulphate. Amine mixtures containing (2-hydroxypropyl)-(1-methyl-2 hydroxyethyl)-methylamine and bis-(2-hydroxypropyl)-methylamine at a suitable molar ratio can be prepared by reacting methylamine with propylene oxide at appropriate reaction conditions and are commercially available from BASF and from Lanxess.

In the first step, bis-(2-hydroxypropyl)-methylamine or the mixture of amines is reacted with the fatty acid, preferably in a molar ratio of fatty acid to amine of from 1.2 to 2.0. The reaction is preferably carried out at a temperature of from 160 to 220° C. Water is preferably removed by distillation from the reaction mixture. During the course of the reaction, the pressure is preferably reduced from ambient pressure to a pressure in the range from 100 to 5 mbar to enhance the removal of water. The first step may be carried out in the presence of an acidic catalyst, which is preferably used in an amount of from 0.05 to 0.2% by weight. Suitable acidic catalysts are methanesulfonic acid, p-toluenesulfonic acid and hypophosphorous acid. The reaction is preferably carried out until the acid value of the reaction mixture is in the range from 1 to 10 mg KOH/g. The acid value is determined by titration with a standardized alkaline solution according to ISO 660 and is calculated as mg KOH per g sample.

In the second step, the reaction mixture obtained in the first step is reacted with dimethyl sulfate, preferably at a molar ratio of dimethyl sulphate to amine of from 0.90 to 0.97. The reaction is preferably carried out at a temperature of from 60 to 100° C. The reaction is preferably carried out until the total amine value of the reaction mixture is in the range from 1 to 8 mg KOH/g. The total amine value is determined by non-aqueous titration with perchloric acid according to method Tf 2a-64 of the American Oil Chemists Society and is calculated as mg KOH per g sample.

In a first method of the invention for preparing an organophilic clay of the invention, a mixture comprising a smectite-type clay, from 0 to 15% by weight water and/or polar solvent and a quaternary ammonium salt, comprising at least 75 mol-% bis-(2-hydroxypropyl)-dimethylammonium methylsulfate fatty acid ester, is homogenized at a temperature above the melting point of the quaternary ammonium salt, and the resulting homogenized mixture is dried. The term polar solvent stands for a solvent having a dielectric constant of more than 10 at 25° C. and preferably has a dielectric constant of more than 20 at 25° C. The dielectric constant of the polar solvent is in general lower than the dielectric constant of water. Preferred polar solvents are monohydric, dihydric or polyhydric alcohols having from 1 to 4 carbon atoms, such as ethanol, 1-propanol, 2-propanol, ethylene glycol, propylene glycol and glycerol. The polar solvent may be used mixed with water or with one or more other polar solvents. In this case, the range of from 0 to 15% by weight applies to the combined amount of water and polar solvents. The mixture for preparing the organophilic clay preferably comprises water, polar solvent or both in a combined amount of water and polar solvents of from 0.1 to 15% by weight and more preferably from 8 to 12% by weight.

The smectite-type clay is preferably used as a dry or water-moist powder. Water or mixtures of water and an alcohol may be added separately or may be charged with the smectite-type clay. An alcohol solvent may be added separately, with the smectite-type clay or with the quaternary ammonium salt.

The quaternary ammonium salt is preferably added as a melt and may comprise up to 15% by weight of an alcohol, such as ethanol, 2-propanol or 1,2-propane diol as a diluent. The quaternary ammonium salt preferably has a melting point of from −10 to 80° C. as defined above. The quaternary ammonium salt is preferably used in an amount providing a molar ratio of ammonium nitrogen to exchangeable cations of the smectite-type clay of from 0.9:1 to 1.1:1, preferably 0.95:1 to 1.05:1. The molar ratio here refers to the cation-exchange capacity as defined above.

The mixture of smectite-type clay, water and/or polar solvent, and quaternary ammonium salt can be homogenized with a conventional solids mixer or blender and is preferably homogenized with a pug mill or an extruder. The mixture is homogenized at a temperature above the melting point of the quaternary ammonium salt and is preferably homogenized for 15 to 30 minutes.

The resulting homogenized mixture is then dried to remove all or a part of the water and polar solvent. Drying is preferably carried out at 60 to 70° C. The homogenized mixture may be subjected to grinding before it is dried, after it has been dried or both before and after it has been dried. Grinding may be carried out with conventional grinders or mills, such as a hammer mill, a ball mill or a rotor mill.

The homogenized mixture is preferably subjected to grinding after it has been dried. After the grinding, particles larger than 75 μm are preferably removed by sieving.

In a second method of the invention for preparing an organophilic clay of the invention, an aqueous suspension of a smectite-type clay is mixed with a quaternary ammonium salt, comprising at least 75 mol-% bis-(2-hydroxypropyl)-dimethylammonium methylsulfate fatty acid ester, at a temperature above the melting point of the quaternary ammonium salt, solids are separated from the resulting suspension and the separated solids are dried.

The aqueous suspension of the smectite-type clay preferably comprises from 2 to 20% by weight clay and is preferably prepared by dispersing the smectite-type clay in water or an aqueous solution using a conventional high shear mixer or blender such as a Waring® blender.

The quaternary ammonium salt is preferably added as a melt and may comprise up to 15% by weight of an alcohol, such as ethanol, 2-propanol or 1,2-propane diol as a diluent. The quaternary ammonium salt preferably has a melting point of from −10 to 80° C. as defined above. The quaternary ammonium salt is preferably used in an amount providing a molar ratio of ammonium nitrogen to exchangeable cations of the smectite-type clay of from 0.9:1 to 1.1:1, preferably 0.95:1 to 1.05:1. The molar ratio here refers to the cation-exchange capacity as defined above.

Mixing of the aqueous suspension and the quaternary ammonium salt can be carried out with conventional mixers or blenders and is preferably carried out using the same device as used for preparing the aqueous suspension of the smectite-type clay. Mixing is preferably carried out for 30 to 60 minutes before the solids are separated from the resulting suspension.

Solids can be separated from the resulting suspension by any suitable technique, such as filtration or centrifugation.

The separated solids are then dried. Drying can be carried out as described above for the first method of the invention.

The dried solid is preferably subjected to grinding after it has been dried. Grinding of the dries solid can be carried out as described further above. After the grinding, particles larger than 75 μm are preferably removed by sieving.

The organophilic clay of the invention is useful for thickening oil based compositions, such as oil based drilling fluids, paints or sealants. The bis-(2-hydroxypropyl)-dimethylammonium fatty acid esters contained in the organophilic clay of the invention are fully biodegradable and the organophilic clay of the invention is therefore useful for formulating biodegradable oil based compositions. Biodegradation of the quaternary ammonium ions contained in the organophilic clay of the invention regenerates the inorganic clay used for making the organophilic clay of the invention. Leaching of quaternary ammonium salt from the organophilic clay of the invention does not pose an environmental hazard due to the rapid biodegradation of the bis-(2-hydroxypropyl)-dimethylammonium fatty acid esters.

The organophilic clay of the invention has better stability to hydrolysis compared to prior art organophilic clays containing quaternary ammonium ions with ester linkages and therefore can be used in oil based compositions comprising water, even at elevated temperatures, providing stability in such compositions comparable to organophilic clays containing tetraalkylammonium ions. The organophilic clay of the invention is therefore preferably used in oil based composition comprising from 5 to 40% by weight water and is useful for thickening water in oil emulsions.

The organophilic clay of the invention is particularly useful for thickening drilling fluids for drilling oil or gas wells, as it can be used for formulating biodegradable drilling fluids that can be used for off-shore drilling in environmentally sensitive areas and provides sufficient hydrolysis stability at a temperature of 120° C. and presumably even at higher temperatures.

The invention is therefore also directed at a drilling fluid for drilling oil or gas wells, comprising an oil phase and an organophilic clay of the invention.

The oil phase may comprise any oil known from the prior art to be useful for formulating a drilling fluid and is preferably a mixture of fatty acid methyl esters. Such mixtures are known as biodiesel and are commercially available.

The drilling fluid of the invention preferably comprises from 10 to 50 g/l of the organophilic clay of the invention.

The drilling fluid of the invention preferably further comprises a dispersed aqueous phase, preferably with a weight ratio of oil phase to dispersed aqueous phase, excluding solids dispersed in the phases, in the range from 95:5 to 50:50, more preferably in the range from 90:10 to 70:30. The aqueous phase may be water or a salt solution, such as a solution of sodium chloride or calcium chloride, and is preferably a concentrated calcium chloride solution containing about 30% by weight calcium chloride.

The drilling fluid of the invention may additionally comprise one or more emulsifiers for dispersing the aqueous phase in the oil phase and stabilizing the dispersion.

The drilling fluid of the invention may further comprise a weighting agent, preferably barite.

EXAMPLES

Example 1

Organophilic Clay from bis-(2-hydroxypropyl)-dimethylammonium methylsulfate Oleic Acid Diester Prepared by a Dry Process NATIONAL® PREMIUM S sodium bentonite (50 g) from Bentonite Performance Minerals was placed in the mortar of a running Retsch® RM 200 mortar grinder with a hard porcelain mortar and pestle heated to 60° C. Deionized water (5 g) was added dropwise to swell the clay and the resulting mixture was ground for a further three minutes. Then molten bis-(2-hydroxypropyl)-dimethylammonium methylsulfate oleic acid diester (38.8 g) was added and the mixture was ground for 20 minutes. The resulting organophilic clay was dried in an oven at 60° C. for 16 h, ground with a Brinkmann Retsch® ZM-1 laboratory benchtop ultra centrifugal mill grinder, and sieved through a 200 mesh screen to provide an organophilic clay powder with a particle size of less than 75 μm.

Exxon Escaid™ 110 hydrocarbon fluid (280 ml), 30% by weight aqueous solution of calcium chloride (72.4 ml), organophilic clay powder (8.0 g), stearic acid (6.0 g) and calcium hydroxide (0.8 g) were placed in a Hamilton Beach® HMD200 mixer and mixed for 30 min at setting II to prepare a base drilling fluid. Rheological properties and emulsion stability were determined at 48.9° C. (120° F.) for the freshly prepared base drilling fluid and for samples aged by rotating them at 25 min⁻¹ for 16 h at 121° C. (250° F.) in an OFITE® five roller oven from OFI testing equipment. Rheological properties were determined according to American Petroleum Institute Recommended Practice 13D using a Couette coaxial cylinder rotational viscometer model 800 from OFI testing equipment. Emulsion stability was determined as dielectric breakdown voltage with an electrical stability meter from OFI testing equipment.

Table 1 lists the average rheological data for three preparations of the base drilling fluid as prepared and after dynamical aging at 121° C.(250° F.). Emulsion stability was determined four times for each sample and table 1 gives the average values with 95% confidence intervals.

A drilling fluid for drilling oil or gas wells can be prepared by mixing 350 g of the base drilling fluid with 236 g of Barite and 6 g of a secondary emulsifier, such as a fatty amidoamine or fatty imidazoline.

TABLE 1

Rheological properties and emulsion stability of the base drilling fluid of example 1

| | Viscosimeter rotation rate in min⁻¹ | Fresh | Aged |
| --- | --- | --- | --- |
| Viscosity in mPa*s | 600 | 19 | 24 |
| | 300 | 28 | 42 |

TABLE 1-continued

Rheological properties and emulsion stability
of the base drilling fluid of example 1

| Viscosimeter rotation rate in min$^{-1}$ | Fresh | Aged |
|---|---|---|
| 200 | 38 | 59 |
| 100 | 66 | 108 |
| 60 | 110 | 180 |
| 30 | 200 | 360 |
| 6 | 1000 | 1700 |
| 3 | 2200 | 1900 |
| Plastic viscosity in mPa*s | 9 | 5 |
| Yield point in Pa | 9 | 18 |
| Low shear rate yield point in Pa | 9 | 23 |
| 10 s gel strength in Pa | 11 | 8 |
| 10 min gel strength in Pa | 15 | 6 |
| Dielectric breakdown voltage in V | 1137 ± 83 | 743 ± 22 |

Example 2

Organophilic Clay from
bis-(2-hydroxypropyl)-dimethylammonium
methylsulfate Fatty Acid Diester of a Partially
Hydrogenated Tallow Fatty Acid Prepared by a Dry
Process Example 1 was repeated using 38.0 g of bis-(2-hydroxypropyl)-dimethylammonium methylsulfate fatty acid diester of partially hydrogenated tallow fatty acid with an iodine value of 20.

Table 2 lists the average rheological data for three preparations of the base drilling fluid as prepared and after aging at 121° C. Emulsion stability was determined four times for each sample and table 2 gives the average values with 95% confidence intervals.

TABLE 2

Rheological properties and emulsion stability
of the base drilling fluid of example 2

| | Viscosimeter rotation rate in min$^{-1}$ | Fresh | Aged |
|---|---|---|---|
| Viscosity in mPa*s | 600 | 12 | 29 |
| | 300 | 18 | 53 |
| | 200 | 23 | 77 |
| | 100 | 33 | 153 |
| | 60 | 50 | 255 |
| | 30 | 90 | 510 |
| | 6 | 350 | 2900 |
| | 3 | 700 | 3400 |
| Plastic viscosity in mPa*s | | 6 | 4 |
| Yield point in Pa | | 6 | 23 |
| Low shear rate yield point in Pa | | 3 | 39 |
| 10 s gel strength in Pa | | 4 | 16 |
| 10 min gel strength in Pa | | 8 | 13 |
| Dielectric breakdown voltage in V | | 660 ± 28 | 965 ± 25 |

Example 3 (Comparative)

Organophilic Clay from
bis-(2-hydroxyethyl)-dimethylammonium chloride
Fatty Acid Diester Prepared by a Dry Process Example 1 was repeated with grinding for 15 minutes, using 37.8 g of bis-(2-hydroxyethyl)-dimethylammonium chloride fatty acid diester of partially hydrogenated tallow fatty acid with an iodine value of 20.

Table 3 lists the average rheological data for three preparations of the base drilling fluid as prepared and after aging at 121° C. Emulsion stability was determined four times for each sample and table 3 gives the average values with 95% confidence intervals.

TABLE 3

Rheological properties and emulsion stability
of the base drilling fluid of example 3

| | Viscosimeter rotation rate in min$^{-1}$ | Fresh | Aged |
|---|---|---|---|
| Viscosity in mPa*s | 600 | 6 | 7 |
| | 300 | 7 | 9 |
| | 200 | 9 | 11 |
| | 100 | 12 | 15 |
| | 60 | 20 | 20 |
| | 30 | 30 | 35 |
| | 6 | 150 | 150 |
| | 3 | 250 | 300 |
| Plastic viscosity in mPa*s | | 5 | 6 |
| Yield point in Pa | | 1 | 2 |
| Low shear rate yield point in Pa | | 2 | 1 |
| 10 s gel strength in Pa | | 1 | 1 |
| 10 min gel strength in Pa | | 2 | 2 |
| Dielectric breakdown voltage in V | | 152 ± 8 | 28 ± 1 |

Example 4 (Comparative)

Organophilic Clay from
di(C14-C18-alkyl)dimethylammonium chloride
Prepared by a Dry Process Example 1 was repeated using 33.4 g of di(C14-C18-alkyl)dimethylammonium chloride.

Table 4 lists the average rheological data for three preparations of the base drilling fluid as prepared and after aging at 121° C. Emulsion stability was determined four times for each sample and table 4 gives the average values with 95% confidence intervals.

TABLE 4

Rheological properties and emulsion stability
of the base drilling fluid of example 4

| | Viscosimeter rotation rate in min$^{-1}$ | Fresh | Aged |
|---|---|---|---|
| Viscosity in mPa*s | 600 | 9 | 34 |
| | 300 | 11 | 60 |
| | 200 | 12 | 87 |
| | 100 | 18 | 171 |
| | 60 | 20 | 283 |
| | 30 | 35 | 570 |
| | 6 | 100 | 2750 |
| | 3 | 200 | 4700 |
| Plastic viscosity in mPa*s | | 7 | 8 |
| Yield point in Pa | | 2 | 25 |
| Low shear rate yield point in Pa | | 1 | 19 |
| 10 s gel strength in Pa | | 1 | 16 |
| 10 min gel strength in Pa | | 2 | 18 |
| Dielectric breakdown voltage in V | | 521 ± 65 | 1073 ± 54 |

Example 5

Organophilic Clay from bis-(2-hydroxypropyl)-dimethylammonium methylsulfate Fatty Acid Diester of a Partially Hydrogenated Tallow Fatty Acid Prepared by a Wet Process Deionized water (700 ml) was placed in a Waring® two speed blender. The blender was set to high speed, NATIONAL® PREMIUM E sodium bentonite (30 g) from Bentonite Performance Minerals were added and the mixture was blended for 30 s. The resulting suspension was poured into a 3 l beaker containing 1.5 l water and heated to 80° C. on a hot plate while stirring at 100 min$^{-1}$ with an overhead stirrer. The stirring rate was then increased to 500 min$^{-1}$, molten bis-(2-hydroxypropyl)-dimethylammonium methylsulfate fatty acid diester of a partially hydrogenated tallow fatty acid (22.8 g) with an iodine value of 20 were added slowly with stirring and the resulting mixture was stirred for a further 30 min at 500 min$^{-1}$ without heating. The organophilic clay was then separated by vacuum filtration over Fisherbrand® Q8 filter paper, dried in an oven at 60° C. for 16 h, ground with a Brinkmann Retsch® ZM-1 laboratory benchtop ultra centrifugal mill grinder, and sieved through a 200 mesh screen to provide an organophilic clay powder with a particle size of less than 75 µm.

A base drilling fluid was prepared by the procedure of example 1.

Table 5 lists the rheological data for the base drilling fluid as prepared and after aging at 121° C. Emulsion stability was determined five times for each sample and table 5 gives the average values with 95% confidence intervals.

TABLE 5

Rheological properties and emulsion stability of the base drilling fluid of example 5

|  | Viscosimeter rotation rate in min$^{-1}$ | Fresh | Aged |
| --- | --- | --- | --- |
| Viscosity in mPa*s | 600 | 8.5 | 31 |
|  | 300 | 18 | 59 |
|  | 200 | 23 | 87 |
|  | 100 | 36 | 170 |
|  | 60 | 55 | 300 |
|  | 30 | 110 | 590 |
|  | 6 | 500 | 2000 |
|  | 3 | 1000 | 2800 |
| Plastic viscosity in mPa*s |  | 0 | 2 |
| Yield point in Pa |  | 9 | 27 |
| Low shear rate yield point in Pa |  | 5 | 24 |
| 10 s gel strength in Pa |  | 6 | 12 |
| 10 min gel strength in Pa |  | 8 | 9 |
| Dielectric breakdown voltage in V |  | 266 ± 4 | 826 ± 25 |

Examples 1 to 3 demonstrate that the organophilic clays of the invention are more efficient in thickening a drilling fluid than prior art organophilic clays prepared with bis-(2-hydroxyethyl)-dimethylammonium fatty acid ester salts and provide better emulsion stability of the drilling fluid at high temperatures. A comparison with example 4 shows that the organophilic clays of the invention provide thickening and emulsion stability at a level that allows replacing a conventional organophilic clay, made from a non-biodegradable tetraalkylammonium salt, in a drilling fluid.

All references cited herein are fully incorporated by reference. Having now fully described the invention, it will be understood by one of skill in the art that the invention may be performed within a wide and equivalent range of conditions, parameters and the like, without affecting the spirit or scope of the invention or any embodiment thereof.

The invention claimed is:

1. A method for preparing an organophilic clay, comprising:
    a) homogenizing a mixture comprising:
       i) a smectite-type clay;
       ii) 0 to 15% by weight water and/or polar solvent; and
       iii) a quaternary ammonium salt comprising at least 75 mol-% bis-(2-hydroxypropyl)-dimethylammonium methylsulfate fatty acid ester;
       wherein the homogenizing is performed at a temperature above the melting point of the quaternary ammonium salt; and
    b) drying the resulting homogenized mixture;
    wherein the organophilic clay comprises the smectite-type clay ion exchanged with quaternary ammonium ions, wherein at least 75 mol-% of said quaternary ammonium ions are bis-(2-hydroxypropyl)-dimethylammonium fatty acid esters and at least 90% of the fatty acid moieties of said bis-(2-hydroxypropyl)-dimethylammonium fatty acid esters have a structure RC(O) with group R being a linear alkyl or alkenyl group containing from 9 to 21 carbon atoms.

2. The method of claim 1, wherein, the resulting homogenized mixture of paragraph b) is subjected to grinding after it has been dried.

3. The method of claim 2, wherein, after grinding, particles larger than 75 µm are removed by sieving.

4. The method of claim 1, wherein the quaternary ammonium salt has a melting point of from −10 to 80° C.

5. The method of claim 1, wherein the organophilic clay, further comprises (2-hydroxypropyl)-(1-methyl-2-hydroxyethyl)-dimethylammonium fatty acid esters, wherein the molar ratio of bis-(2-hydroxypropyl)-dimethylammonium fatty acid esters to (2-hydroxypropyl)-(1-methyl-2-hydroxyethyl)-dimethylammonium fatty acid esters is from 4:1 to 20:1.

6. The method of claim 5, wherein the organophilic clay comprises water or an alcohol.

7. The method of claim 5, wherein the resulting homogenized mixture of paragraph b) is subjected to grinding after it has been dried.

8. The method of claim 7, wherein, after grinding, particles larger than 75 µm are removed by sieving.

9. The method of claim 5, wherein the quaternary ammonium salt has a melting point of from −10 to 80° C.

10. The method of claim 1, wherein the smectite-type clay comprises bentonite.

11. The method of claim 1, wherein the bentonite comprises at least 60% by weight montmorillonite.

12. The method of claim 10, wherein, in the bis (2 hydroxypropyl)-dimethylammonium fatty acid esters having the structure RC(O), said R groups have an average chain length of from 16 to 18 carbon atoms.

13. The method of claim 12, wherein R groups have an iodine value of from 0 to 120, calculated for the free fatty acid RCOOH.

14. The method of claim 13, wherein said bis-(2-hydroxypropyl)-dimethylammonium fatty acid esters on average have a molar ratio of fatty acid moieties to ammonium nitrogen of from 1.2 to 2.0.

15. The method of claim 1, wherein, in accordance with paragraph a)ii), the mixture comprises the polar solvent.

16. The method of claim 15, wherein the polar solvent is a monohydric, dihydric or polyhydric alcohol having from 1 to 4 carbon atoms.

17. The method of claim 15, wherein the polar solvent is selected from the group consisting of: ethanol, 2-propanol, ethylene glycol, propylene glycol, and glycerol.

18. The method of claim 1, wherein, in accordance with paragraph a)ii), the mixture comprises water and the polar solvent in a combined amount of 0.1 to 15% by weight.

19. The method of claim 18, wherein water and the polar solvent are in a combined amount of 8 to 12% by weight.

20. The method of claim 1, wherein the mixture of paragraph a) is homogenized with a pug mill or an extruder.

* * * * *

UNITED STATES PATENT AND TRADEMARK OFFICE
CERTIFICATE OF CORRECTION

PATENT NO. : 11,634,621 B2
APPLICATION NO. : 17/087621
DATED : April 25, 2023
INVENTOR(S) : Smith et al.

It is certified that error appears in the above-identified patent and that said Letters Patent is hereby corrected as shown below:

In the Claims

Column 13, Line 4, Claim 17 should read:
The method of claim 15, wherein the polar solvent is selected from the group consisting of:
ethanol; 1-propanol, 2-propanol, ethylene glycol, propylene glycol and glycerol.

Signed and Sealed this
Fifteenth Day of August, 2023

Katherine Kelly Vidal
*Director of the United States Patent and Trademark Office*